(12) United States Patent
Edwards et al.

(10) Patent No.: US 8,181,797 B2
(45) Date of Patent: May 22, 2012

(54) PORTABLE GRILLING UTENSIL RACK

(75) Inventors: Neil Edwards, Kernersville, NC (US); Beth Tinsley, Statesville, NC (US); Courtnee Mullins, Advance, NC (US)

(73) Assignee: Liberty Hardware Mfg. Corp., Winston-Salem, NC (US)

( * ) Notice: Subject to any disclaimer, the term of this patent is extended or adjusted under 35 U.S.C. 154(b) by 119 days.

(21) Appl. No.: 12/388,560

(22) Filed: Feb. 19, 2009

(65) Prior Publication Data

US 2010/0206826 A1 Aug. 19, 2010

(51) Int. Cl.
*A47B 47/00* (2006.01)
(52) U.S. Cl. ......... 211/195; 211/70.7; 211/85; 248/166; 248/175
(58) Field of Classification Search ............... 211/133.5, 211/70.7, 186, 187, 150, 168, 170, 174, 85, 211/149, 195; 248/166, 170, 175; 280/651, 280/79.2, 42; 16/319; 403/102
See application file for complete search history.

(56) References Cited

U.S. PATENT DOCUMENTS

| | | | |
|---|---|---|---|
| 1,054,221 A * | 2/1913 | Loranger | 16/319 |
| 1,145,297 A * | 7/1915 | Erickson et al. | 248/97 |
| 2,451,829 A * | 10/1948 | Hightower | 248/100 |
| 2,577,811 A * | 12/1951 | Rutledge | 403/102 |
| D180,868 S * | 8/1957 | Diehl | D34/24 |
| 3,870,261 A * | 3/1975 | McSwain | 248/101 |
| 3,874,531 A * | 4/1975 | Mayo | 414/680 |
| 4,208,959 A | 6/1980 | Schmidt | |
| 4,233,890 A | 11/1980 | Jansen | |
| 4,321,857 A | 3/1982 | Best | |
| 4,434,780 A | 3/1984 | Hepner | |
| 4,512,466 A * | 4/1985 | Delang | 206/370 |
| 4,526,399 A * | 7/1985 | Holtz | 280/655 |
| 4,854,297 A | 8/1989 | Shuman | |
| 4,856,740 A * | 8/1989 | MacLeod et al. | 248/97 |
| 4,896,651 A | 1/1990 | Kott, Jr. | |
| 4,934,333 A | 6/1990 | Ducate, Jr. et al. | |
| 5,040,809 A * | 8/1991 | Yang | 280/42 |
| 5,048,857 A * | 9/1991 | Stevens | 280/651 |
| 5,050,577 A | 9/1991 | Baynes et al. | |
| 5,050,731 A | 9/1991 | Byanes et al. | |
| 5,076,252 A | 12/1991 | Schlosser et al. | |
| 5,085,329 A * | 2/1992 | Crowell et al. | 211/195 |
| 5,163,358 A | 11/1992 | Hanagan et al. | |
| 5,184,599 A | 2/1993 | Stuart | |
| 5,209,517 A * | 5/1993 | Shagoury | 280/654 |
| 5,307,797 A | 5/1994 | Kleefeld | |
| 5,471,916 A | 12/1995 | Bird et al. | |
| 5,558,359 A * | 9/1996 | Phears | 280/654 |
| 5,572,983 A | 11/1996 | Schlosser et al. | |
| 5,765,469 A | 6/1998 | Schlosser et al. | |
| 5,819,718 A | 10/1998 | Leiser | |
| 5,826,838 A * | 10/1998 | Forbes | 248/97 |
| 5,865,099 A | 2/1999 | Waugh | |
| 5,934,183 A | 8/1999 | Schlosser et al. | |
| 5,934,184 A | 8/1999 | Schlosset et al. | |
| 5,967,134 A | 10/1999 | Harris | |
| 6,029,646 A | 2/2000 | Jackson | |
| 6,076,782 A * | 6/2000 | Alderman | 248/97 |

(Continued)

*Primary Examiner* — Korie Chan
(74) *Attorney, Agent, or Firm* — Carlson Gaskey & Olds P.C.

(57) ABSTRACT

An outdoor storage rack includes a set of supports mounted to a base through a respective hinge assembly such that said rack is movable between an extended and a stored position.

20 Claims, 6 Drawing Sheets

U.S. PATENT DOCUMENTS

| | | |
|---|---|---|
| 6,098,611 A | 8/2000 | Fillmore |
| 6,131,560 A | 10/2000 | Healy |
| 6,230,700 B1 | 5/2001 | Daniels et al. |
| 6,276,023 B1 | 8/2001 | Grundy |
| 6,382,573 B1 * | 5/2002 | Cepeda .......................... 248/97 |
| 6,439,220 B1 | 8/2002 | Johnson |
| 6,546,925 B1 | 4/2003 | Wu |
| 6,557,545 B2 | 5/2003 | Williams |
| 6,694,964 B2 | 2/2004 | Wu |
| 6,701,912 B1 | 3/2004 | Siegel et al. |
| 6,705,306 B1 | 3/2004 | Dickey |
| 6,755,187 B2 | 6/2004 | Harrod et al. |
| 6,827,078 B2 | 12/2004 | Price |
| 6,883,267 B1 * | 4/2005 | Pruitt .......................... 43/54.1 |
| 6,910,475 B2 | 6/2005 | Zelek et al. |
| 7,080,811 B2 | 7/2006 | Thompson |
| 7,117,865 B2 | 10/2006 | Siegel et al. |
| 7,117,866 B2 | 10/2006 | Cantal |
| 7,152,525 B2 | 12/2006 | Armstrong |
| 7,163,011 B2 | 1/2007 | Pestrue |
| 7,263,988 B2 | 9/2007 | Viers |
| 7,284,393 B1 | 10/2007 | Macmillan |
| 7,284,549 B1 | 10/2007 | Eby et al. |
| 7,866,494 B1 * | 1/2011 | Emile .......................... 211/196 |

* cited by examiner

CLOSED POSITION

STEP 2.

STEP 3.

STEP 4.

STEP 5.

STEP 6.

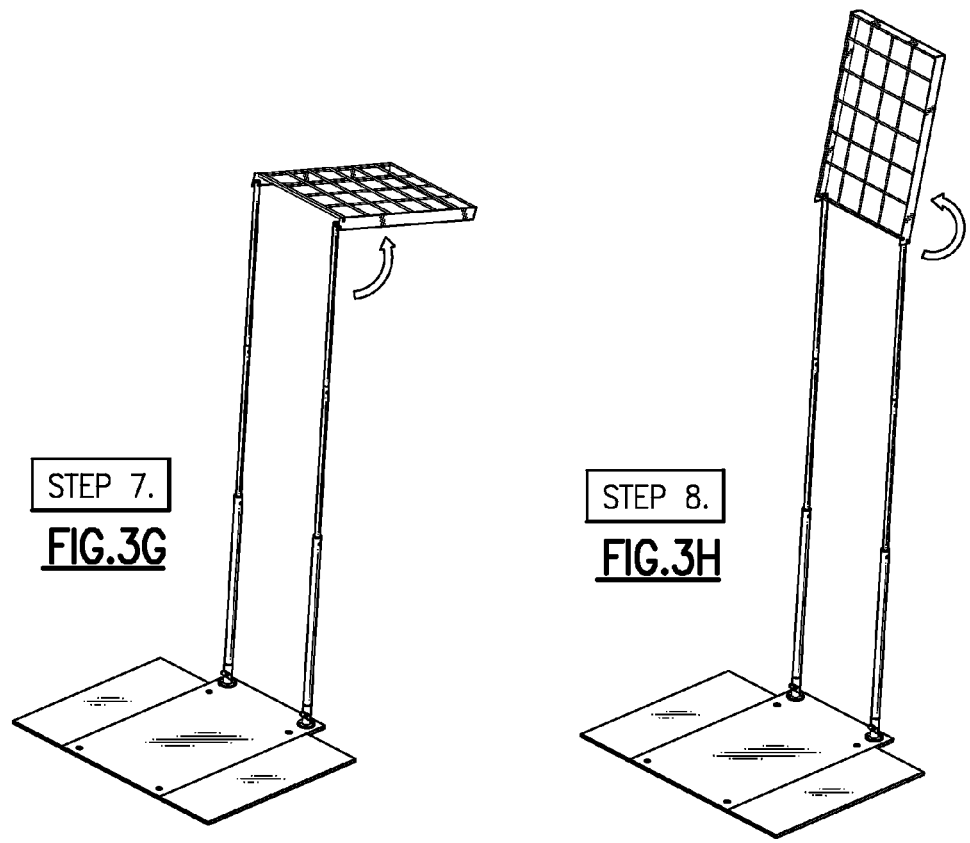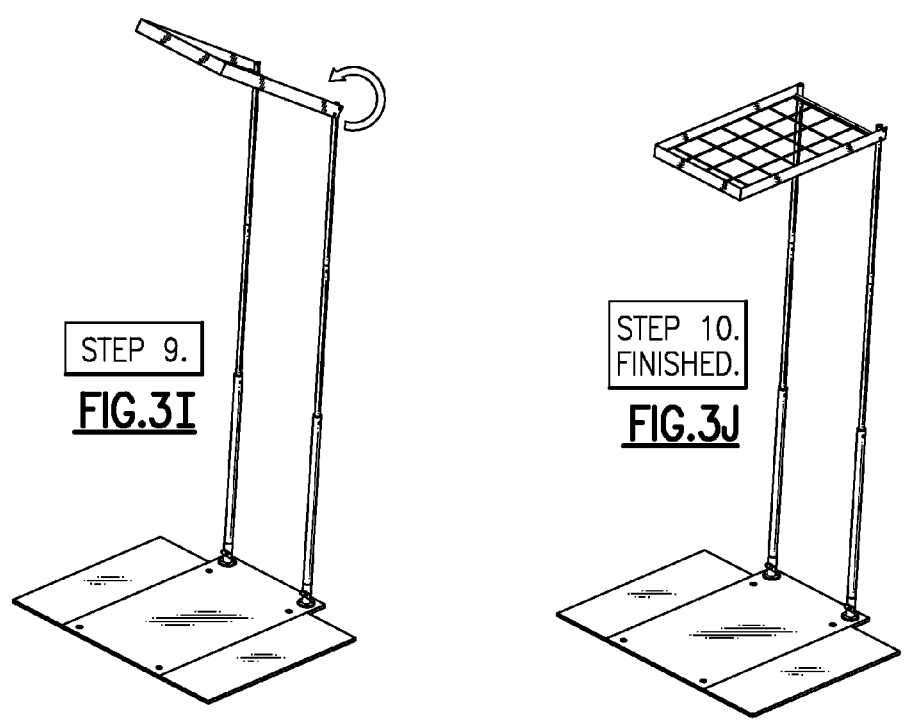

PORTABLE GRILLING UTENSIL RACK

BACKGROUND

The present disclosure relates to an outdoor barbecue system, and more particularly to a portable grilling utensil rack.

Home barbecue and outdoor grill equipment is ubiquitous in the well-equipped American home. Auxiliary workstation carts have been developed for use with the usual barbecue equipment. Such auxiliary workstation carts provide storage space for utensils and additional countertop space for food preparation and serving.

Although effective, the barbecue equipment and auxiliary workstation carts may require a fair amount of storage space.

SUMMARY

An outdoor storage rack according to an exemplary aspect of the present disclosure includes a set of telescopic supports mounted to a base through a respective hinge assembly such that said rack is movable between an extended and a stored position.

A method of deploying an outdoor storage rack according to an exemplary aspect of the present disclosure includes: pivoting a set of supports relative a base; telescoping said set of supports; and pivoting a rack relative the set of supports.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIGS. 3A-3J, the outdoor storage rack assembly is illustrated being extended from a stored position;

DETAILED DESCRIPTION

Figure 1:
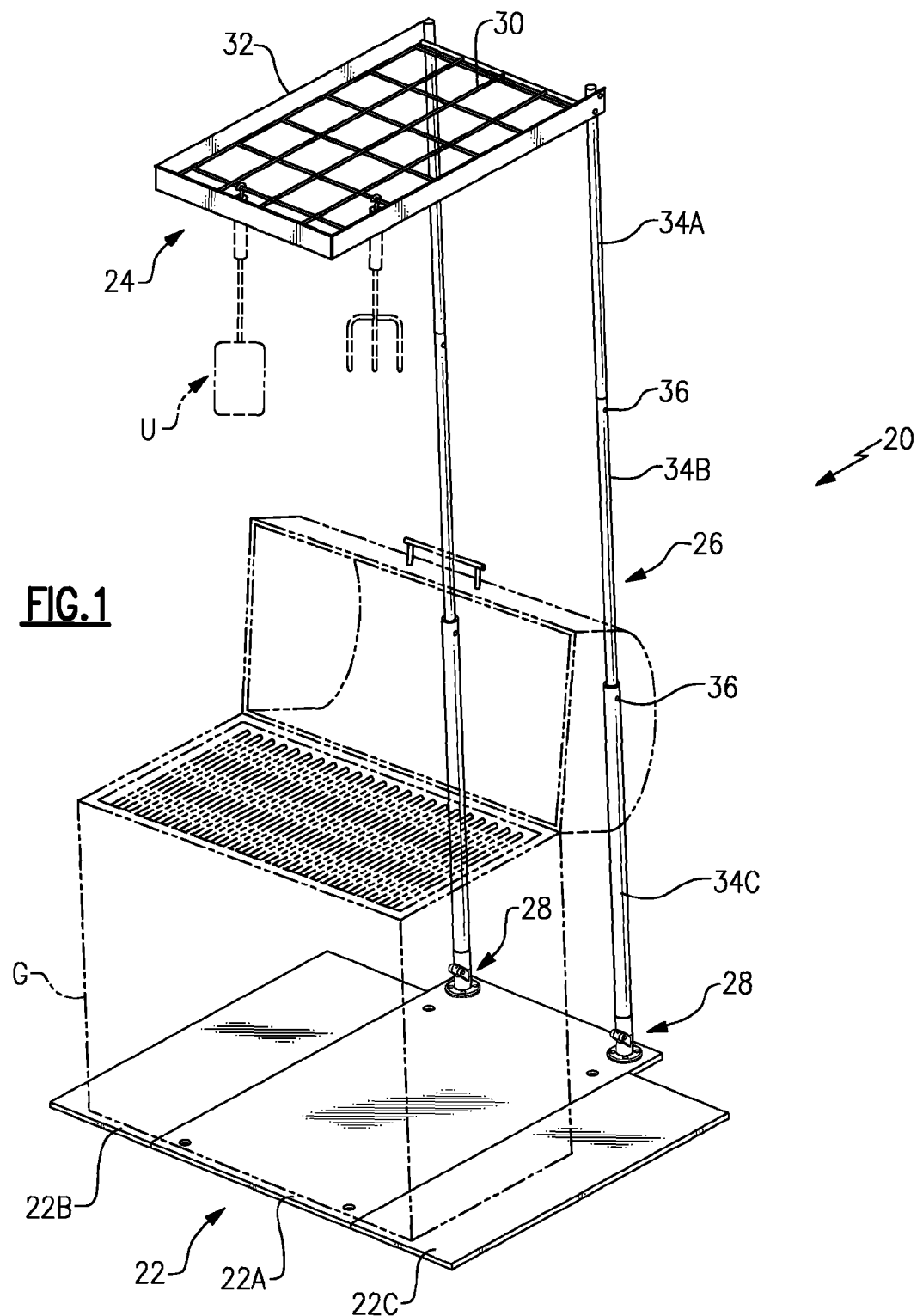
FIG. 1 is a general perspective view of an outdoor storage rack.

FIG. 1 schematically illustrates a portable outdoor storage rack assembly 20. The rack assembly 20 generally includes a base 22, a rack 24, and a set of telescopic supports 26 which are mounted to the base 22 through a respective hinge assembly 28.

Figure 3A:
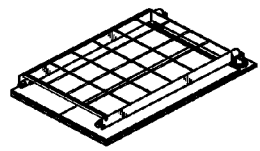

The base 22 in one non-limiting embodiment may be a non-metallic textured surface grill mat that supports a grill (illustrated schematically at G). The base 22 includes three sections 22A, 22B, 22C. The base center section 22A is mounted to the outer sections 22B, 22C such that the outer sections 22B, 22C may fold relative the center section 22A. The base 22 in a folded condition may be generally the same size (e.g., at least in terms of the area defined by their respective perimeters) as the rack 24 (FIG. 3A). The outer sections 22B, 22C fold out and essentially double the size (e.g., the perimeter) of the center section 22A (FIGS. 3C-3D). The base 22 is large enough to accommodate various grills and the outer edges of the outer sections 22B, 22C may be beveled to facilitate the grill G being rolled onto the base 22.

The rack 24 includes a rack surface 30 and a three-sided edge 32 therearound. The rack surface 30 may be a mesh or other grid type surface. The rack 24 is pivotally fastened to the telescopic supports 26 such that the rack 24 may swivel approximately two hundred and seventy degrees then be supported approximately ninety degrees relative the telescopic supports 26 and over the base 22 (FIGS. 3E-3J). The rack 24 will thereby hang directly over the base 22 when placed in the operational position. The three-sided edge 32 also essentially covers the telescopic supports 26 and hinge assemblies 28 when in the stored position (FIG. 3A).

A user may readily hang grilling utensils (illustrated schematically at U) from the rack surface 30 above the grill G in an easy to reach location. The rack surface 30 may also be utilized to provide additional storage space.

Each of the telescopic supports 26 in the disclosed non-limiting embodiment may include three sections 34A-34C which telescope between a retracted and an extended position. Each of the sections 34A-34C include a spring loaded pin mechanism 36. As each section 34 is extended the respective spring loaded pin mechanism 36 snaps into an aperture to lock the sections 34 in the extended position. It should be understood that various lock arrangements may alternatively be provided.

Figure 2A:
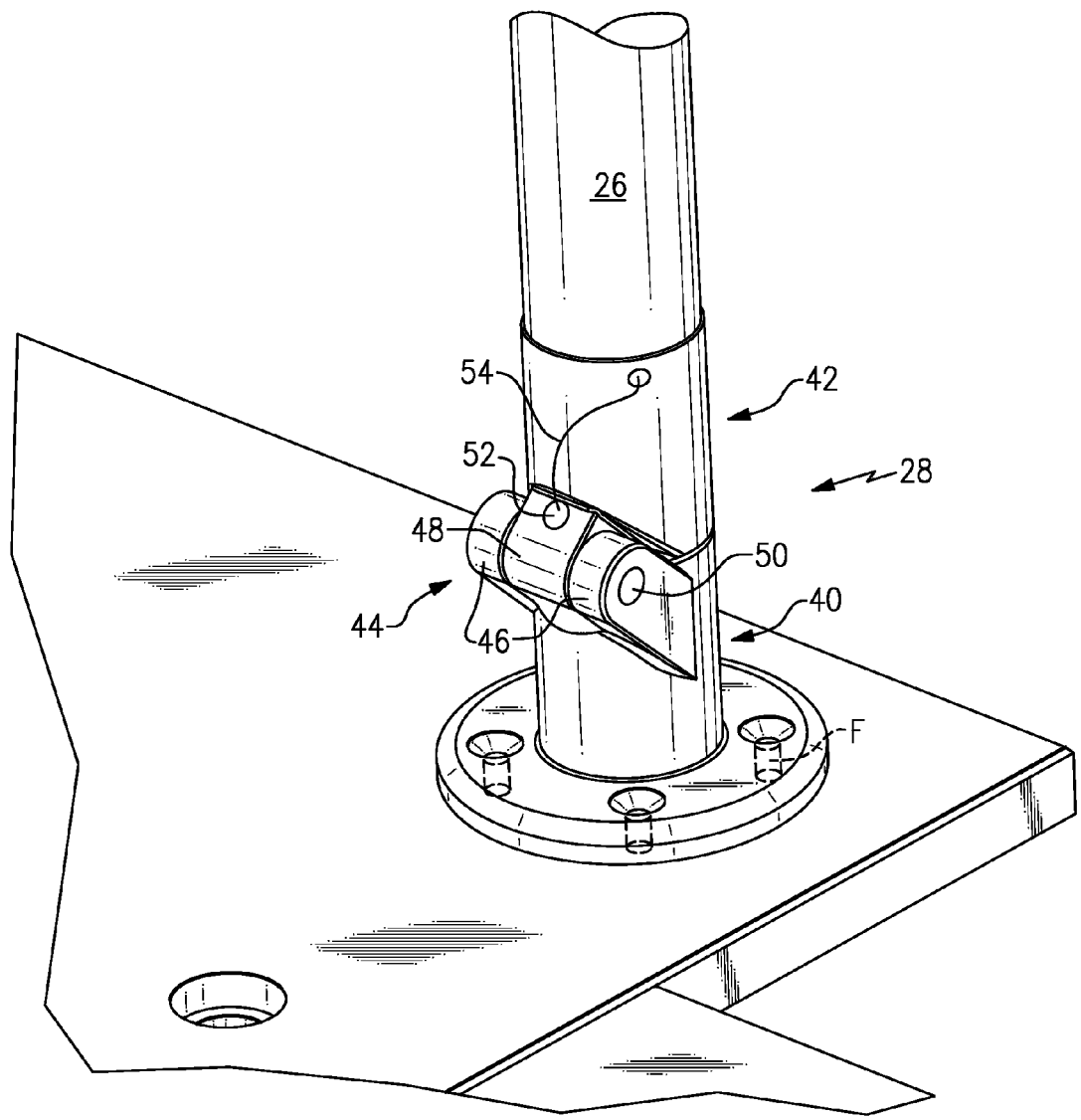
FIG. 2A is a general perspective view of a hinge assembly in an extended position.
Figure 2B:
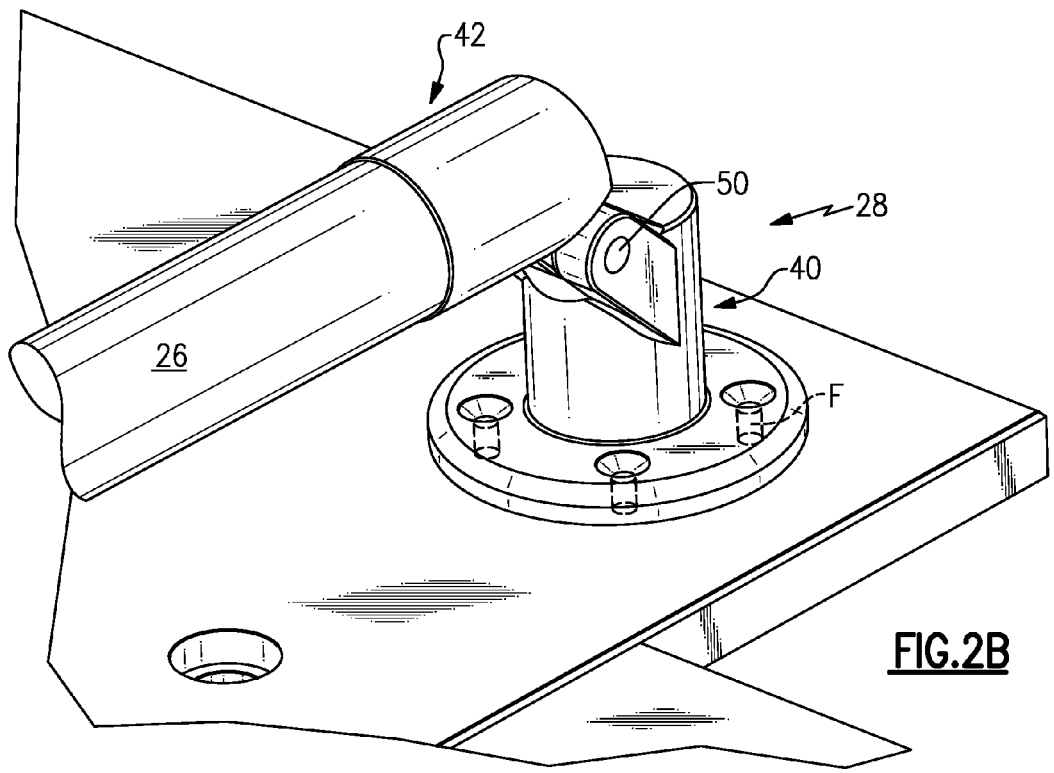
FIG. 2B is a general perspective view of a hinge assembly in a stored position.

Each support 26 is mounted to the respective hinge assembly 28. The hinge assembly 28 is attached to the base 22 through fasteners F (FIGS. 2A, 2B). The hinge assembly 28 provides for an approximately ninety degree fold to facilitate storage of the rack 24 adjacent the base 22 (FIG. 3A).

Referring to FIG. 2A, the hinge assembly 28 includes a hinge base 40 and a hinge support 42 which are attached through a hinge 44. The hinge base 40 is attachable to the base 22 and the hinge support 42 is generally cylindrical to receive the support 26.

Figure 2C:
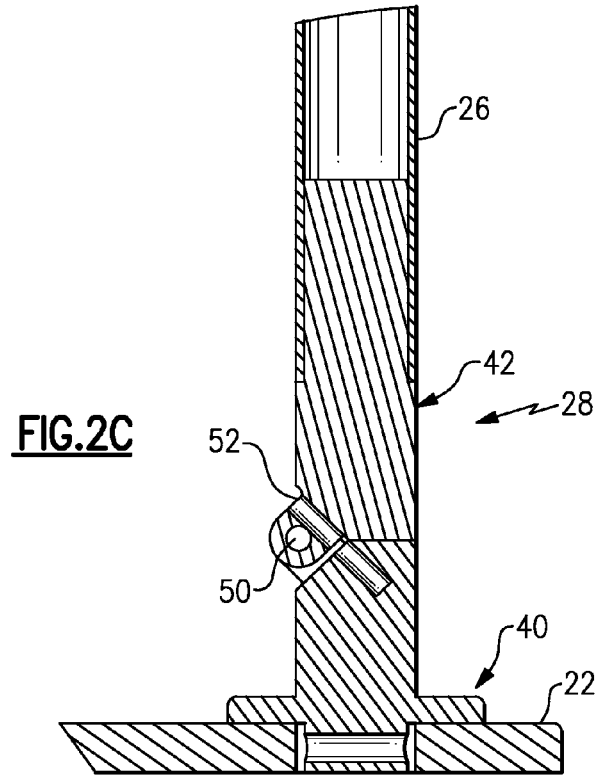
FIG. 2C is a sectional view of the hinge assembly in the extended position.

The hinge base 40 includes hinge arms 46 which extend at an approximately forty-five degree angle. The hinge support 42 also includes a hinge arm 48 which receives a hinge pin 50 to provide movement between the extended position (FIG. 2A) and the folded position (FIG. 2B). The hinge assembly 28 is maintained in the extended position by insertion of a lock pin 52 through the hinge arm 48 and into the hinge base 40 (FIG. 2C). The lock pin 52 may be attached to the hinge assembly 28 through a tether 54. It should be understood that other restraints may be utilized.

Figure 3B:
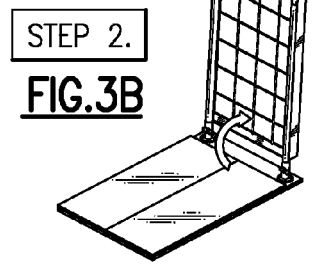
Figure 3C:
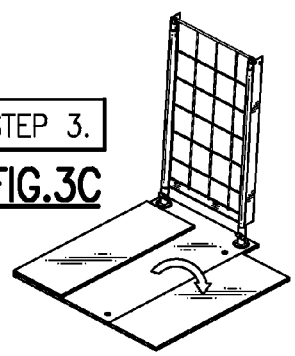
Figure 3D:
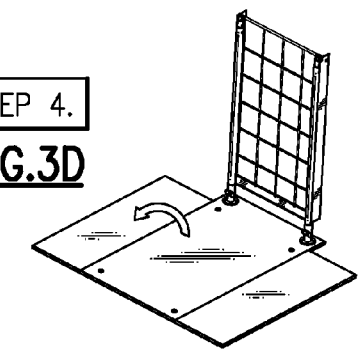
Figure 3E:
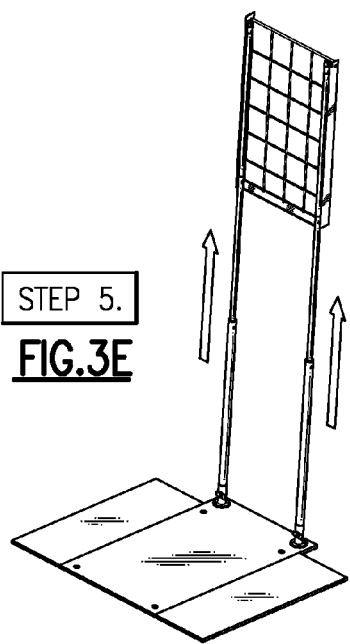
Figure 3F:
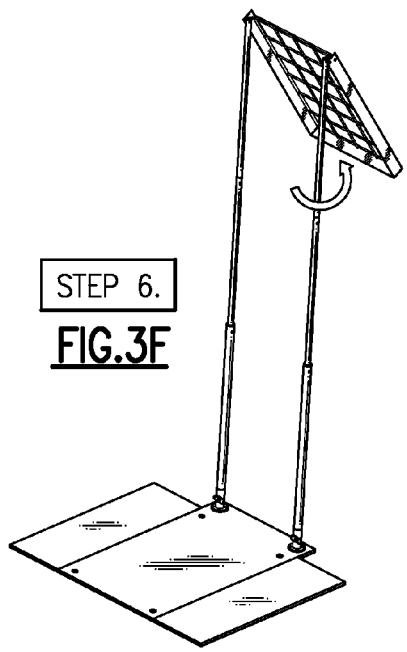

Referring to FIGS. 3A-3J, the portable outdoor storage rack assembly 20 may readily be unfolded from a compact stored package. The rack 24 is pivoted relative the base 22 at the hinge assemblies 28 and the lock pin 52 is located through the hinge arm 48 and into the hinge base 40 to lock the hinge assemblies 28 in the extended position (FIG. 3B). The outer sections 22B, 22C are then folded outward from the center section 22A (FIGS. 3C-3D). The telescopic supports 26 are then telescoped to the extended position (FIG. 3E). The rack 24 is then swiveled approximately two hundred and seventy degrees until the rack 24 is supported approximately ninety degrees relative the telescopic supports 26 over the base 22 (FIGS. 3F-3J). The rack 24 essentially abuts the telescopic supports 26 to maintain the extended position. It should be understood that the procedure is essentially reversed to store the rack 24.

Figure 4:
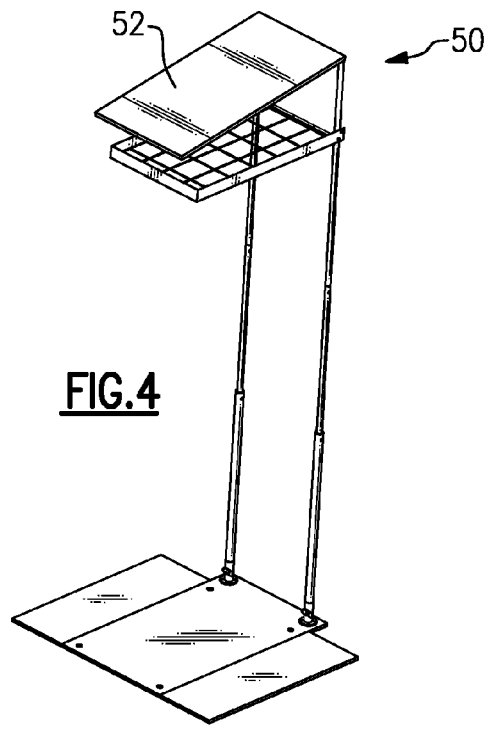
FIG. 4 is a general perspective view of an outdoor storage rack with an accessory.

Referring to FIG. 4, an attachment 50 such as a lightweight roof attachment 52 may be attached atop the telescopic supports 26.

Figure 5:
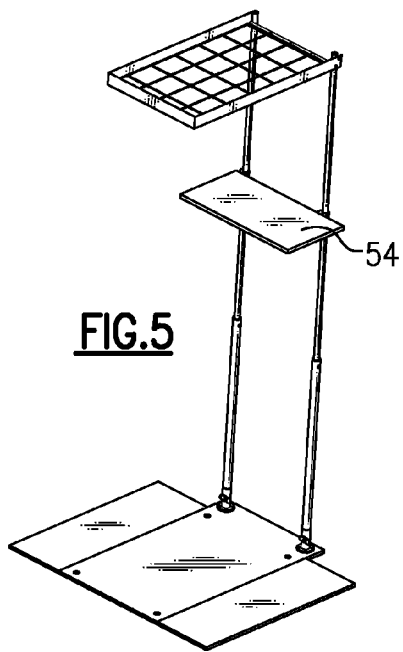
FIG. 5 is a general perspective view of an outdoor storage rack with an accessory.

Referring to FIG. 5, an attachment 50 such as a lightweight shelf 54 may be attached to the telescopic supports 26.

Figure 6:
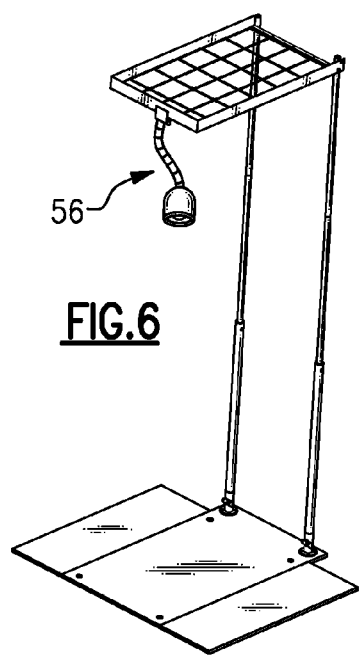
FIG. 6 is a general perspective view of an outdoor storage rack with an accessory.

Referring to FIG. 6, an attachment 50 such as a lightweight battery operated light 56 may be attached to the rack 24 to provide light for grilling in the evening.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason, the appended claims should be studied to determine true scope and content.

What is claimed:

1. An outdoor storage rack, comprising:
   a base defined by a perimeter and including a base center section and first and second outer sections foldable relative to the base center section, said first and second outer sections being foldable relative to one another;
   a set of supports mounted to said base through a respective hinge assembly;
   a rack pivotally fastened to said set of supports;
   wherein, when at least one of said first and second outer sections is folded out, the perimeter of the base is increased relative to when the at least one of said first and second outer sections is folded onto the base center section; and
   wherein the base center section is positioned directly on a ground surface.

2. The outdoor storage rack as recited in claim 1, wherein said rack is pivotable approximately two hundred and seventy degrees relative to said set of supports.

3. The outdoor storage rack as recited in claim 2, wherein said rack is supported approximately ninety degrees relative said set of supports and over said base in an extended position.

4. The outdoor storage rack as recited in claim 1, wherein each of said respective hinge assemblies pivot through approximately ninety degrees.

5. An outdoor storage rack, comprising:
   a base;
   a rack;
   a set of supports mounted to said base through a respective hinge assembly;
   wherein each of said respective hinge assemblies is locked in an extended position by a lock pin;
   wherein each of said respective hinge assemblies include a hinge support which pivots relative a hinge base, said lock pin extends through a hinge arm which extends from said hinge support and into said hinge base to lock each of said respective hinge assemblies; and
   wherein the hinge base extends upward from an upper face of the base center section.

6. The outdoor storage rack as recited in claim 1, wherein said rack includes a grid for hanging of at least one grill utensil.

7. The outdoor storage rack as recited in claim 1, further comprising a roof mountable to said set of supports.

8. The outdoor storage rack as recited in claim 1, further comprising a shelf mountable to said set of supports.

9. A method of deploying an outdoor storage rack comprising:
   pivoting a set of supports relative a base;
   extending the set of supports;
   pivoting a rack relative the set of supports, said rack pivotally fastened to said set of supports;
   folding a first outer section of the base relative both a center portion of the base and a second outer section of the base, wherein said folding of the first outer section of the base increases the perimeter of the base; and
   positioning a grill on the base.

10. A method as recited in claim 9, wherein pivoting a set of supports relative a base further comprises:
    pivoting the set of supports ninety degrees relative the base;
    locking a hinge assembly which supports each of said set of supports.

11. A method as recited in claim 9, wherein pivoting the rack relative the set of supports further comprises:
    pivoting the rack approximately two hundred and seventy degrees relative the set of supports.

12. A method as recited in claim 9, wherein extending the set of supports further comprises:
    telescoping the set of supports.

13. The outdoor storage rack as recited in claim 1, wherein an area of the base is defined within the perimeter of the base, and wherein, when the at least one outer section is folded out, the area of the base increases.

14. The outdoor storage rack as recited in claim 1, wherein the first and second outer sections are pivotably attached to respective edges of the base center section.

15. The method as recited in claim 9, further including the step of:
    folding the second outer section of the base in order to further increase the perimeter of the base.

16. The outdoor storage rack as recited in claim 14, wherein the first and second outer sections are foldable between a folded position on the base center section and a folded out position generally away from the base center section.

17. The outdoor storage rack as recited in claim 16, wherein, when both the first outer section and the second outer section are folded out, the perimeter of the base is increased relative to when only one of said first outer section and said second outer section is folded out.

18. The outdoor storage rack as recited in claim 16, wherein the base center section is generally defined in a plane.

19. The outdoor storage rack as recited in claim 18, wherein, when at least one of the first and second outer sections is folded out, the at least one of the first and second outer sections is generally defined in the plane of the base center section.

20. The outdoor storage rack as recited in claim 1, wherein a grill is positioned on the base.

* * * * *